(12) United States Patent
Narendran et al.

(10) Patent No.: US 12,352,408 B2
(45) Date of Patent: Jul. 8, 2025

(54) 3-D OPTICS WITH BEAM FORMING FEATURES

(71) Applicant: RENSSELAER POLYTECHNIC INSTITUTE, Troy, NY (US)

(72) Inventors: Nadarajah Narendran, Clifton Park, NY (US); Ukwatte Lokuliyanage Indika Upendra Perera, Clifton Park, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 17/413,623

(22) PCT Filed: Dec. 13, 2019

(86) PCT No.: PCT/US2019/066200
§ 371 (c)(1),
(2) Date: Jun. 14, 2021

(87) PCT Pub. No.: WO2020/123924
PCT Pub. Date: Jun. 18, 2020

(65) Prior Publication Data
US 2022/0034482 A1  Feb. 3, 2022

Related U.S. Application Data

(60) Provisional application No. 62/779,704, filed on Dec. 14, 2018, provisional application No. 62/885,212, (Continued)

(51) Int. Cl.
*F21V 13/04* (2006.01)
*B33Y 80/00* (2015.01)
(Continued)

(52) U.S. Cl.
CPC ............. *F21V 13/04* (2013.01); *B33Y 80/00* (2014.12); *F21V 5/04* (2013.01); *F21V 5/08* (2013.01)

(58) Field of Classification Search
CPC ... F21V 13/04; F21V 5/04; F21V 5/08; F21V 13/02; F21V 13/00; F21V 5/043;
(Continued)

(56) References Cited

U.S. PATENT DOCUMENTS 8,462,437 B2  7/2013  Thuot et al.
8,746,923 B2  6/2014  Ashdown et al.
(Continued)

FOREIGN PATENT DOCUMENTS

WO  2013046081 A1  4/2013
WO  2013132381 A1  9/2013

OTHER PUBLICATIONS

International Search Report and The Written Opinion of the International Searching Authority, International Application No. PCT/US2019/066200, dated Mar. 2, 2020.

*Primary Examiner* — Bao Q Truong
(74) *Attorney, Agent, or Firm* — Barclay Damon LLP; Anthony P. Gangemi

(57) ABSTRACT

In an embodiment, there is provided a three-dimensional (3-D) optic for beam shaping. The 3-D optic includes a first surface, a second surface and a beam forming feature. The first surface is configured to receive incident light. The second surface is positioned relative to the first surface and is configured to emit a light beam having a shape. The emitted beam shape is related to the beam forming feature. The beam forming feature is formed by a 3-D manufacturing process.

16 Claims, 5 Drawing Sheets

Related U.S. Application Data filed on Aug. 10, 2019, provisional application No. 62/947,035, filed on Dec. 12, 2019.

(51) Int. Cl.
*F21V 5/04* (2006.01)
*F21V 5/08* (2006.01)

(58) Field of Classification Search
CPC . F21V 5/02; F21V 5/005; F21V 5/004; F21V 5/002; B33Y 80/00
See application file for complete search history.

(56) References Cited

U.S. PATENT DOCUMENTS

| | | |
|---|---|---|
| 8,827,496 B2 | 9/2014 | VanderSchuit |
| 8,915,620 B2 | 12/2014 | Vaes et al. |
| 9,442,241 B2 | 9/2016 | Morgan et al. |
| 9,483,965 B2 | 11/2016 | Zhou et al. |
| 9,644,815 B2 | 5/2017 | Thijssen et al. |
| 9,714,756 B2 | 7/2017 | Morgan et al. |
| 9,765,949 B2 * | 9/2017 | Shen .................. F21V 13/04 |
| 10,001,266 B2 | 6/2018 | Lim et al. |
| 10,030,825 B2 | 7/2018 | Lunz et al. |
| 10,072,816 B2 | 9/2018 | Shen et al. |
| 2009/0279296 A1 | 11/2009 | Poel |
| 2012/0273663 A1 | 11/2012 | Young |
| 2014/0218915 A1 | 8/2014 | Ashdown et al. |
| 2015/0036339 A1 | 2/2015 | Ashdown et al. |

* cited by examiner

3-D OPTICS WITH BEAM FORMING FEATURES

CROSS REFERENCE TO RELATED APPLICATION(S)

This application claims the benefit of U.S. Provisional Application No. 62/779,704, filed Dec. 14, 2018, U.S. Provisional Application No. 62/885,212, filed Aug. 10, 2019, and U.S. Provisional Application No. 62/947,035, filed Dec. 12, 2019, which are incorporated by reference as if disclosed herein in their entireties.

FIELD

The present disclosure relates to optics, in particular to, three-dimensional (3-D) optics with beam forming features.

BACKGROUND

Different lighting applications may utilize one or more lighting fixtures. Each lighting fixture may be configured to emit a respective light beam having a selected optical beam pattern. The beam patterns may be related to a target distribution of light in a space to be illuminated. For example, when lighting a painting, a lighting fixture with a relatively narrow beam pattern configured to light only the painting may be used. In another example, when lighting a work surface, where generally uniform illumination of the work surface may be desirable, a lighting fixture with a batwing beam pattern may be used.

Lighting fixtures may be characterized by light source type, e.g., incandescent, fluorescent (compact or linear), metal halide, or solid state lighting (such as light emitting diodes (LEDs)). LEDs are generally more efficient than incandescent, fluorescent or metal halide light sources. Lighting fixtures with LEDs as light source may include secondary optics configured to provide beam shaping.

SUMMARY

In an embodiment, there is provided a three-dimensional (3-D) optic for beam shaping. The 3-D optic includes a first surface, a second surface and a beam forming feature. The first surface is configured to receive incident light. The second surface is positioned relative to the first surface and is configured to emit a light beam having a shape. The emitted beam shape is related to the beam forming feature. The beam forming feature is formed by a 3-D manufacturing process.

In some embodiments of the 3-D optic, the 3-D manufacturing process is selected from the group including 3-D printing, additive manufacturing, and/or material deposition.

In some embodiments of the 3-D optic, the beam forming feature is an internal structure positioned between the first surface and the second surface. In some embodiments of the 3-D optic, the beam forming feature is included in at least one of the first surface and the second surface.

In some embodiments of the 3-D optic, at least one of the first surface and the second surface is planar. In some embodiments of the 3-D optic, at least one of the first surface and the second surface is non-planar.

In some embodiments of the 3-D optic, the second surface opposes the first surface, is perpendicular to the first surface or is the same surface as the first surface.

In some embodiments of the 3-D optic, the emitted beam shape is selected from the group including wide beam, narrow beam, batwing beam, and asymmetric beam.

In some embodiments of the 3-D optic, the internal structure corresponds to a void or comprises a material having an optical property different from an optical property of a surrounding region.

In some embodiments, there is provided a lighting fixture. The lighting fixture includes a light source assembly and a three-dimensional (3-D) optic. The light source assembly includes at least one light source. Each light source is configured to emit incident light. The three-dimensional (3-D) optic is configured to receive the emitted incident light and to emit a light beam having a beam shape. The 3-D optic includes a first surface configured to receive the incident light, a second surface positioned relative to the first surface and a beam forming feature. The second surface is configured to emit the light beam. The emitted beam shape is related to the beam forming feature. The beam forming feature is formed by a 3-D manufacturing process.

In some embodiments of the lighting fixture, each light source is selected from the group including a semiconductor a light emitting diode (LED), an organic LED, a polymer LED, a micro-LED and a laser.

In some embodiments of the lighting fixture, the light source assembly includes a plurality of light sources, the 3-D optic includes a plurality of beam forming features and each light source is positioned relative to at least one beam forming feature.

In some embodiments of the lighting fixture, the beam forming feature is an internal structure positioned between the first surface and the second surface. In some embodiments of the lighting fixture, the beam forming feature is included in at least one of the first surface and the second surface.

In some embodiments of the lighting fixture, at least one of the first surface and the second surface is planar. In some embodiments of the lighting fixture, at least one of the first surface and the second surface is non-planar.

In some embodiments of the lighting fixture, the emitted beam shape is selected from the group comprising wide beam, narrow beam, batwing beam, and asymmetric beam.

In some embodiments of the lighting fixture, the internal structure comprises a void or comprises a material having an optical property different from an optical property of a surrounding region.

In some embodiments of the lighting fixture, the lighting fixture further includes a reflector coupled to the 3-D optic configured to reflect at least a portion of the emitted incident light.

In some embodiments of the lighting fixture, the lighting fixture further includes a top layer positioned above the second layer and configured to avoid dirt build up.

BRIEF DESCRIPTION OF THE DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein.

DETAILED DESCRIPTION

Generally, this disclosure relates to three-dimensional (3-D) optics with beam forming features. An apparatus, method and/or system may be configured to form a 3-D optic with a beam forming feature using an additive manufacturing and/or 3-D printing technique. A beam forming feature may include an internal structure and/or may be included in a surface of the 3-D optic. The 3-D optic with beam forming features may then be configured to generate and emit a selected beam pattern. Beam patterns may include, but are not limited to, narrow beam, wide beam, batwing and asymmetric. 3-D printing, for example, may be performed on-site and/or on-demand. In some embodiments, a beam pattern may be adjusted by changing a position of a light source relative to a position of a beam forming feature in an existing 3-D optic. In some embodiments, the 3-D optic may include an added top layer configured to provide a planar surface to reduce or eliminate dirt build up on the top layer and to thus avoid degradation in operation due to dirt.

In an embodiment, there is provided a three-dimensional (3-D) optic for beam shaping. The 3-D optic includes a first surface, a second surface and a beam forming feature. The first surface is configured to receive incident light. The second surface is positioned relative to the first surface and is configured to emit a light beam having a shape. The emitted beam shape is related to the beam forming feature. The beam forming feature is formed by a 3-D manufacturing process.

Figure 1A:
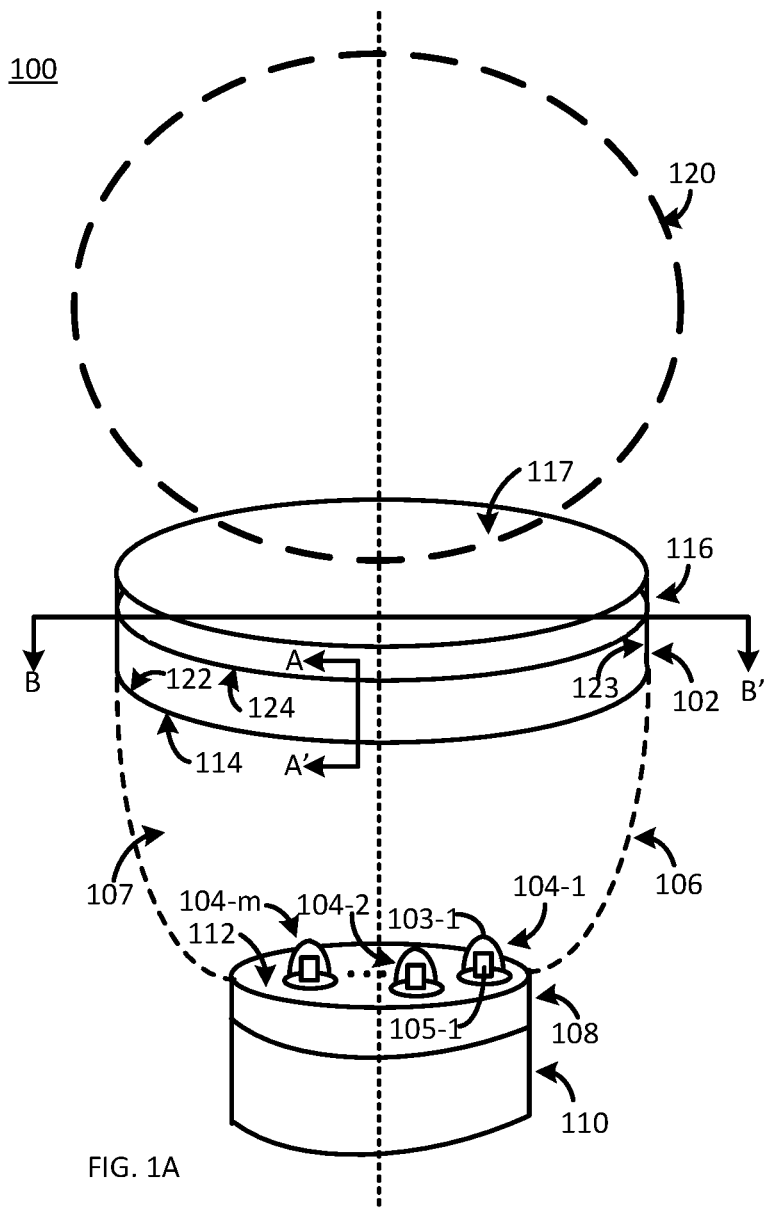
FIGS. 1A and 1B are a sketches of two example optical systems including a 3-D optic with beam forming features consistent with several embodiments of the present disclosure.

FIG. 1A is a sketch of an example optical system 100 including a 3-D optic 102 with beam forming features consistent with several embodiments of the present disclosure. In one nonlimiting example, the optical system 100 may correspond to a lighting fixture. A beam forming feature may include an internal structure and/or a surface shape. As used herein, "internal structure" corresponds to a feature included in a 3-D optic configured to provide beam forming. Internal structures may include, but are not limited to, voids and/or regions of the 3-D optic that contain a first material having an optical property different from an optical property of a surrounding second material. Surface shape may be planar or non-planar, and/or a combination thereof. Optical properties may include, but are not limited to, refractive indices, absorption characteristics, reflection characteristics, etc. The optical system 100 further includes a plurality of light sources, e.g., light emitting diode (LED) packages 104-1, 104-2, . . . , 104-m, a printed circuit board (PCB) 108 and a heat sink 110. In some embodiments, the optical system 100 may further include reflective optics 106. In some embodiments, the optical system 100 may further include a top layer 116.

The LED packages 104-1, 104-2, . . . , 104-m are coupled to the PCB 108. The PCB 108 is configured to couple the LED packages 104-1, 104-2, . . . , 104-m to, for example, an electrical connector. The PCB 108 may be coupled to the heat sink 110 that is configured to cool the LED packages 104-1, 104-2, . . . , 104-m during operation.

The reflective optics 106 may have a generally curved shape. The reflective optics 106 correspond to a sidewall of a cavity 107 defined by the reflective optics 106, the PCB 108 and the 3-D optic 102. The PCB 108 is positioned at a first end 112 of the cavity 107. The 3-D optic 102 is positioned at an opposing second end 114 of the cavity 107.

The 3-D optic 102 has a bottom surface 122, an opposing top surface 124 and a side surface 123. The terms "bottom", "top" and "side" are used for ease of description of the optical system 100, as drawn. The optical system 100 may have any orientation. The bottom surface 122 is positioned at (and may form) the second end 114 of the cavity 107. The bottom surface 122 and/or top surface 124 may be planar or non-planar, as will be described in more detail below. The optical system 100 may include the top layer 116 when the top surface 124 is non-planar. The top layer 116 may include a planar top surface 117. The top layer 116 and planar top surface 117 are configured to provide a smooth external surface of the optical system 100 to, for example, reduce or eliminate dirt buildup on the 3-D optic that can degrade performance of the 3-D optic.

Each LED package, e.g., LED package 104-1, includes an LED, e.g., LED 105-1, configured to emit light. Each LED package, e.g., LED package 104-1, may further include an LED cover, e.g., LED cover 103-1, configured to cover the LED 105-1. The LED cover 103-1 may further define a cavity configured to contain an element that filters the light emitted from the LED 105-1. In one nonlimiting example, the LED 105-1 may be configured to emit blue light and the element may be phosphor so that the light emitted from the LED package 104-1 may be generally white. However, this disclosure is not limited in this regard.

The LED packages 104-1, 104-2, . . . , 104-m are configured to emit light into the cavity 107 at or near the first end 112. Thus, the LEDs and corresponding packages may be considered light sources for the optical system 100. The light emitted from each LED package, e.g., LED package 104-1, may have an associated spectrum and an associated LED emitted beam pattern. At least some of the light emitted from the LED packages 104-1, 104-2, . . . , 104-m may be reflected by the reflective optics 106. At least some of the emitted light (incident and/or reflected) may then be incident on the 3-D optic 102 at the bottom surface 122. The light may be refracted, reflected and/or diffracted by the 3-D optic 102. For example, an optical beam, e.g., optical beam 120, may be emitted by the top surface 124 of the 3-D optic. The optical beam 120 may have an optical beam pattern corresponding to a shape of the optical beam 120. The optical beam pattern may include, but is not limited to, wide beam, narrow beam, batwing beam, asymmetric beam, etc.

The particular optical beam pattern achieved is based, at least in part, on beam forming features of the 3-D optic 102. For example, an optical beam may be emitted by the side surface 123 of the 3-D optic 102. In another example, an optical beam may be emitted by the bottom surface 122, e.g., may be fully reflected within the 3-D optic 102. Whether the optical beam is emitted from the top surface, side surface or bottom surface may be related to characteristics of the beam forming features.

Figure 1B:
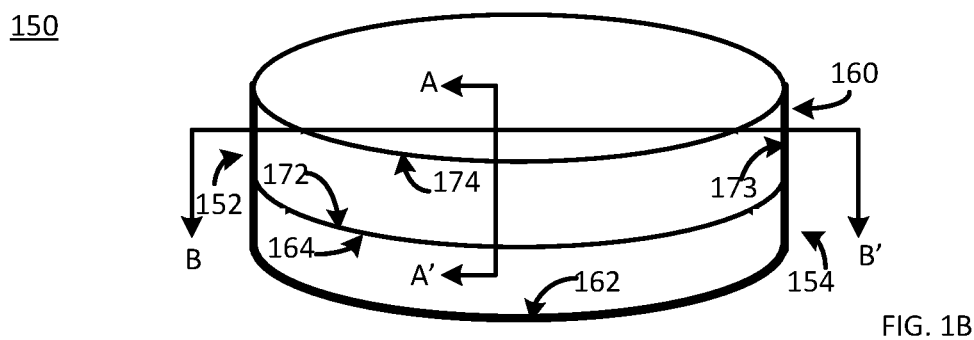

FIG. 1B is a sketch of another example optical system 150 including a 3-D optic 152 with beam forming features consistent with several embodiments of the present disclosure. Optical system 150 further includes a light source assembly 154 coupled to the 3-D optic 152. The light source assembly 154 may contain one or more light sources, as will be described in more detail below.

The 3-D optic 152 includes a bottom surface 172, a top surface 174 and a side surface 173. The light source assembly 154 includes a bottom surface 162 and a top surface 164. The top surface 164 of the light source assembly 154 is adjacent to the bottom surface 172 of the 3-D optic 152. The light source assembly 154 is configured to generate incident light and the top surface 164 is configured to emit incident light. The bottom surface 172 of 3-D optic 152 is configured to receive the emitted incident light. The received incident light may then be beam formed, as described herein, and emitted from 3-D optic 152 at one or more of the top surface 174, the side surface 173 and/or the bottom surface 172.

Optical system 150 further includes a reflector 160. The reflector 160 is configured to reflect light back into the 3-D optic. The reflector is configured to reduce light loss and enhance efficiency. An amount of surface of the optical assembly covered by the reflector may depend on the selected emission surface. For example, if emission is from surface 173, then the reflector 160 may not extend over the side surface 173.

Thus, an optical system may be configured to produce, beam form and emit a light beam. The beam formed light may be emitted from the top surface 174, bottom surface 172 or side surface 173.

Figure 2A:
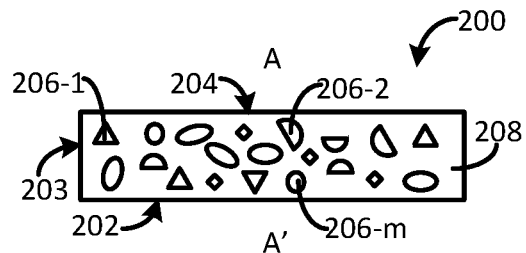
FIGS. 2A through 2D are sketches of cross sections of various example 3-D optics corresponding to the 3-D optics of FIGS. 1A and 1B.

FIGS. 2A through 2D are sketches of cross sections of various example 3-D optics 200, 220, 240 and 260 corresponding to the 3-D optics 102 and 152 of FIGS. 1A and 1B. Turning first to FIG. 2A, example 3-D optic 200 corresponds to cross section A-A'. 3-D optic 200 has a generally rectangular cross-section and includes a bottom surface 202 configured to receive incident light. 3-D optic 200 further includes a top surface 204 and a side surface 203. The top, bottom and/or side surfaces may be configured to emit a light beam. 3-D optic 200 includes a plurality of internal structures 206-1, 206-2, . . . 206-$m$ surrounded by region 208. The internal structures are one example of beam forming features. The surrounding region 208 may be a transparent medium and may be formed of a transparent material including, but not limited to, glass, polymer, plastic, etc.

In an embodiment, the internal structures 206-1, 206-2, . . . 206-$m$ may correspond to internal voids, e.g., air. In another embodiment, the internal structures 206-1, 206-2, . . . 206-$m$ may be formed (e.g., printed, deposited) of a transparent or nontransparent material. In this embodiment, the material of the internal structure regions 206-1, 206-2, . . . 206-$m$ has optical properties that differ from the optical properties of the material of the surrounding region 208. In one nonlimiting example, one or more of the internal structures 206-1, 206-2, . . . 206-$m$ may be formed of a luminescent material. In another example, the internal structures 206-1, 206-2, . . . 206-$m$ may be formed of a material with a different index of refraction than the surrounding region 208.

Figure 2B:
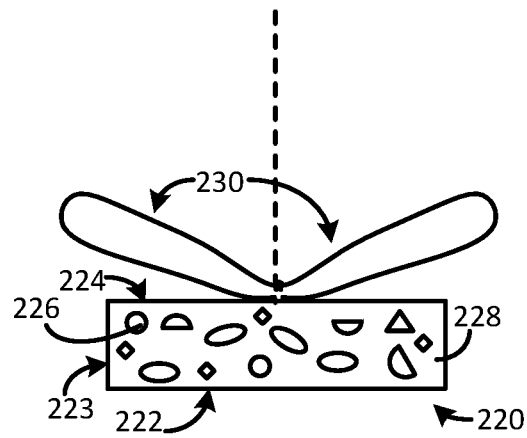

Turning now to FIG. 2B, similar to example 3-D optic 200, example 3-D optic 220 includes a bottom surface 222 configured to receive incident light. 3-D optic 220 further includes a top surface 224 and a side surface 223. The top, bottom and/or side surfaces are configured to emit a light beam 230. Example 3-D optic 220 further includes a plurality of internal structures, e.g., internal structures 226, and a surrounding region 228. In this example 220, a shape of the light beam 230 corresponds to a batwing.

Figure 2C:
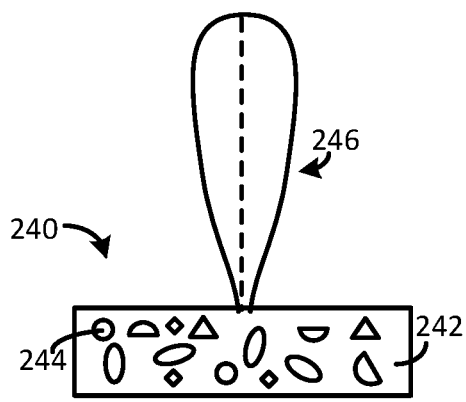
Figure 2D:
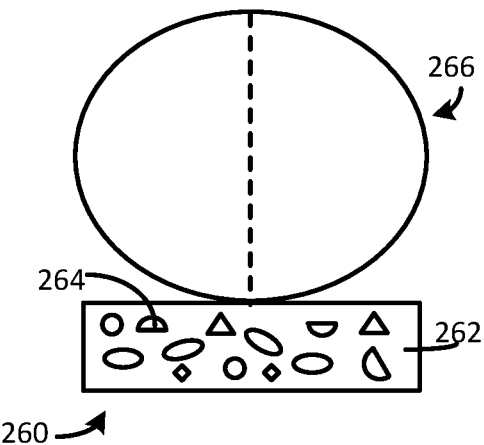

Turning now to FIG. 2C, example 3-D optic 240 includes a plurality of internal structures, e.g., internal structures 244, and a surrounding region 242. In this example 240, a shape of an emitted light beam 246 corresponds to a narrow beam. Turning now to FIG. 2D, example 3-D optic 260 includes a plurality of internal structures, e.g., internal structures 264, and a surrounding region 262. In this example 260, a shape of an emitted light beam 266 corresponds to a wide beam.

Thus, a 3-D optic for beam shaping may include a plurality of internal structures and a surrounding region. The plurality of internal structures are examples of beam forming features. The internal structures may correspond to voids or may be formed of a material with optical properties different from the material of the surrounding region. The internal structures may be configured to shape an emitted light beam. The internal structures may be configured to refract, reflect, diffract and/or absorb incident light to shape the emitted light beam.

Figure 3A:
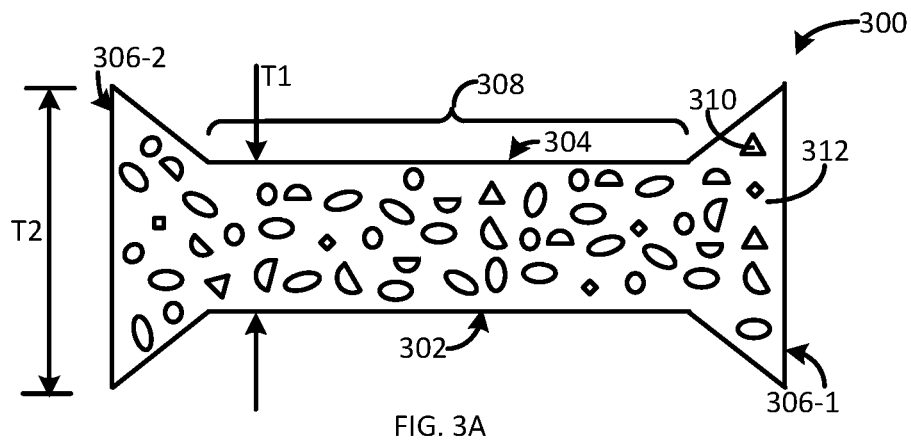
FIGS. 3A through 3C are sketches of cross sections of various example 3-D optics, illustrating various cross section geometries.
Figure 3B:
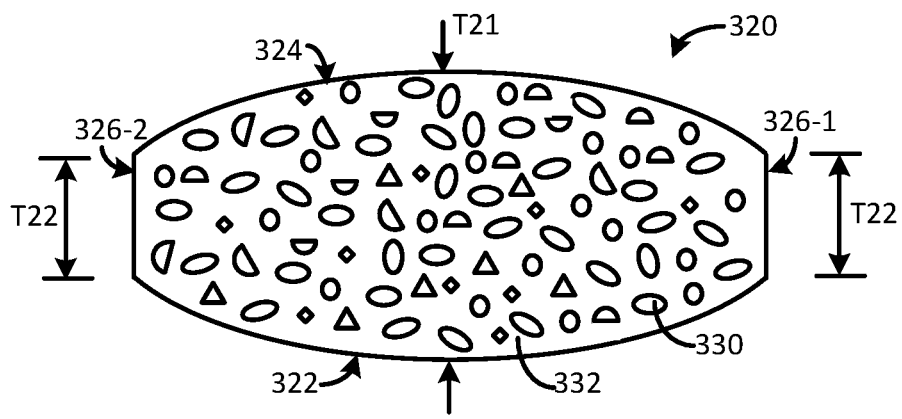
Figure 3C:
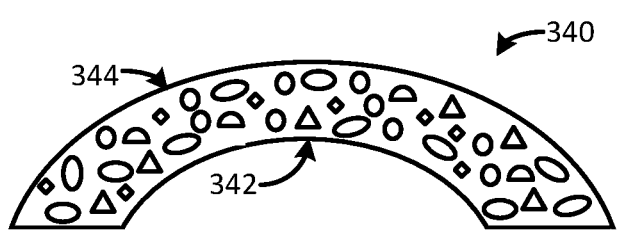

FIGS. 3A through 3C are sketches of cross sections of various example 3-D optics 300, 320, 340, illustrating various cross section geometries. Turning first to FIG. 3A, 3-D optic 300 has a generally bow tie shaped cross section. 3-D optic 300 includes a bottom surface 302 configured to receive incident light and an opposing top surface 304. 3-D optic 300 further includes a first end 306-1 and an opposing second end 306-2. The top surface 304, first end 306-1, second end 306-2 and/or the bottom surface 302 may be configured to emit a light beam. A thickness T1 of a central region 308, positioned between the first end 306-1 and the second end 306-2, is less than a thickness T2 of the first end 306-1 and the second end 306-2. The bottom surface 302 and the top surface 304 ramp from the thickness T2 at the ends 306-1, 306-2 to the thickness T1 of the central region 308. 3-D optic 300 includes a plurality of internal structures (e.g., internal structure 310) and further includes a surrounding region 312. A beam forming feature may include the internal structure and/or the surface geometry. A method of forming 3-D optic 300 includes, but is not limited to, printing, deposition, etc., as described herein. The internal structures may correspond to voids or a material with different optical properties from a material of the surrounding region, as described herein.

Turning now to FIG. 3B, 3-D optic 320 has a generally convex cross section. 3-D optic 320 includes a bottom surface 322 configured to receive incident light and an opposing top surface 324. 3-D optic 320 further includes a first end 326-1 and an opposing second end 326-2. The top surface 324, first end 326-1, second end 326-2 and/or the bottom surface 322 may be configured to emit a light beam. A thickness T21 of a central region, positioned between the first end 326-1 and the second end 326-2, is greater than a thickness T22 of the first end 326-1 and the second and 326-2. The bottom surface 322 and the top surface 324 have a generally symmetric convex curved surface from the thickness T22 at the ends to the thickness T21 of the central region. 3-D optic 320 includes a plurality of internal structures (e.g., internal structure 330) and further includes a surrounding region 332. A beam forming feature may include the internal structure and/or the surface geometry. A method of forming 3-D optic 320 includes, but is not limited to, printing, deposition, etc., as described herein. The internal structures may correspond to voids or a material with optical properties that differ from optical properties of a material of the surrounding region, as described herein.

Turning now to FIG. 3C, 3-D optic 340 has a generally arc shaped cross section. 3-D optic 340 includes a bottom surface 342 configured to receive incident light and an opposing top surface 344. The top surface 344 and/or the bottom surface 342 may be configured to emit a light beam.

The bottom surface 342 and the top surface 344 are generally parallel. 3-D optic 340 includes a plurality of internal structures (e.g., internal structure 350) and further includes a surrounding region 352. A beam forming feature may include the internal structure and/or the surface geometry. A method of forming 3-D optic 340 includes, but is not limited to, printing, deposition, etc., as described herein. The internal structures may correspond to voids or a material different from a material of the surrounding region, as described herein.

Thus, a 3-D optic for beam shaping may have various surface geometries including, but not limited to, bowtie, convex, concave, curved, etc. A beam forming feature may include the internal structure and/or the surface geometry. A shape of an emitted light beam may then be related to the surface geometry, internal structure and/or particular material or materials used.

Figure 4:
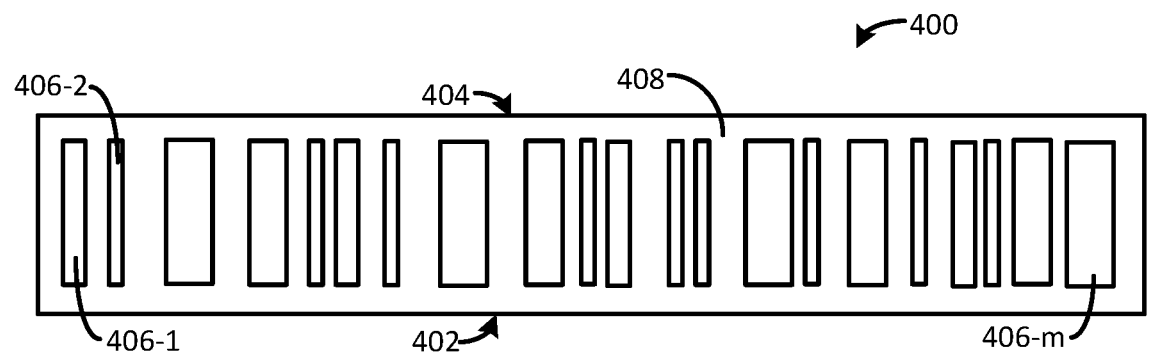
FIG. 4 is a sketch of a cross section of another example 3-D optic, illustrating a diffraction grating like geometry.

FIG. 4 is a sketch of a cross section of another example 3-D optic 400, illustrating a diffraction grating like geometry. In this example, beam forming features may correspond to the diffraction grating like geometry. 3-D optic 400 includes a bottom surface 402 configured to receive incident light and an opposing top surface 404 configured to emit a light beam. The bottom surface 402 and the top surface 404 are generally planar and generally parallel. 3-D optic 400 includes a plurality of internal structures 406-1, 406-2, . . . , 406-$m$ and further includes a surrounding region 408. The internal structures may correspond to voids, printed or deposited materials (with selected optical properties), inserts, and/or a combination thereof. The internal structures 406-1, 406-2, . . . , 406-$m$ of this example 3-D optic 400 are configured as a diffraction grating. Thus, incident light received at the first surface 402 may be refracted by the internal structures and the refracted light may be emitted from the second surface 404.

Figure 5A:
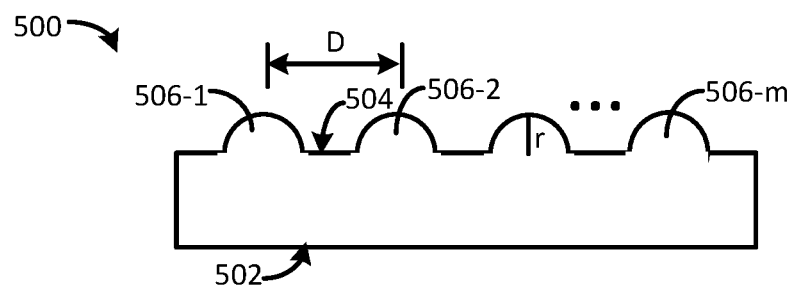
FIGS. 5A and 5B are sketches illustrating two example non-planar 3-D optic surfaces.
Figure 5B:
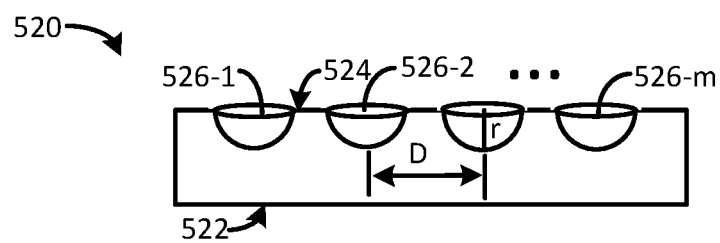

FIGS. 5A and 5B are sketches illustrating two example non-planar 3-D optic surfaces. In these examples, the non-planar surfaces may include and/or may correspond to beam forming features. Turning first to FIG. 5A, 3-D optic 500 includes a first surface 502 configured to receive incident light and an opposing second surface 504. The first surface 502 and/or the second surface may be configured to emit a light beam. The second surface 504 includes a plurality of curved regions 506-1, 506-2, . . . 506-$m$ that extend a distance, r, above a flat portion of the second surface. Adjacent curved regions are separated by a distance, D. In other words, the regions of 3-D optic 500 are generally convex with respect to the flat surface. The second surface 504 may thus correspond to or include beam forming features.

Turning now to FIG. 5B, 3-D optic 520 includes a first surface 522 configured to receive incident light and an opposing second surface 524. The first surface 533 and/or second surface 524 may be configured to emit a light beam. The second surface 524 includes a plurality of curved regions 526-1, 526-2, . . . 526-$m$ that extend a distance, r, into the flat portion of the second surface. Adjacent curved regions are separated by a distance, D. The regions of 3-D optic 500 are generally concave with respect to the flat surface. The second surface 524 may thus correspond to or include beam forming features.

In one nonlimiting example, the curved regions of 506-1, 506-2, . . . 506-$m$ of 3-D optic 500 may have a height, r, of about 2 millimeters (mm) above the second surface 504, a peak thickness (including curved region) of about 6 mm and a diameter of about 8 mm and a spacing of about 2 mm. However, this disclosure is not limited in this regard. In this example, the emitted beam shape may be generally narrow beam.

In another nonlimiting example, the curved regions of the 526-1, 526-2, . . . 526-$m$ may have a height of about 2 mm below the respective second surface 504, 524, a peak thickness (excluding curved region) of about 6 mm and a diameter of about 8 mm and a spacing of about 2 mm. However, this disclosure is not limited in this regard. In this example, the emitted beam shape may be generally batwing shaped.

Figure 6A:
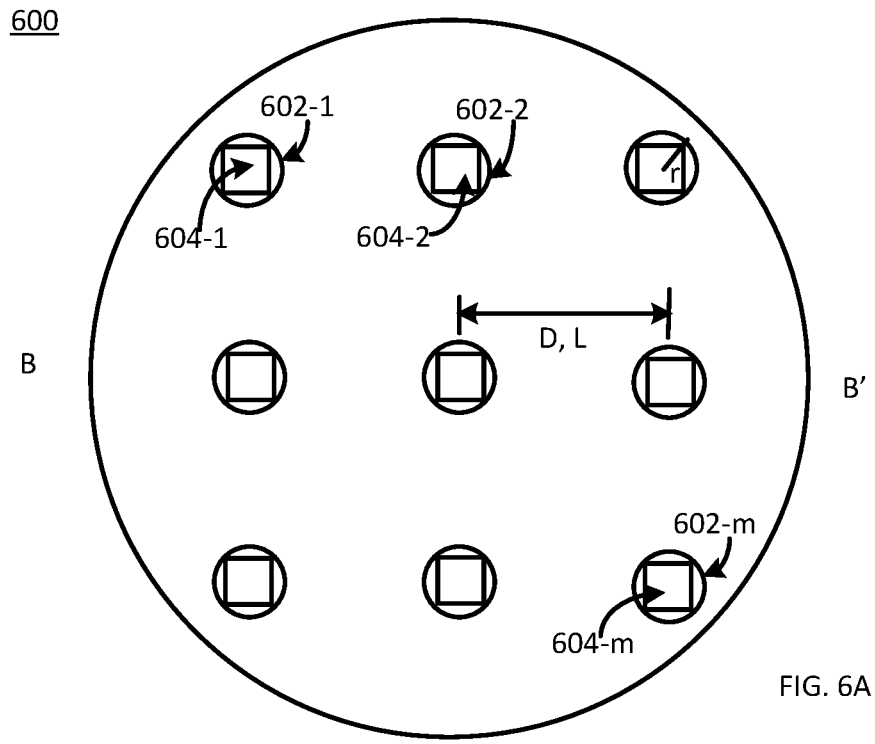
FIGS. 6A and 6B are sketches illustrating two example arrangements of light sources and beam forming features.
Figure 6B:
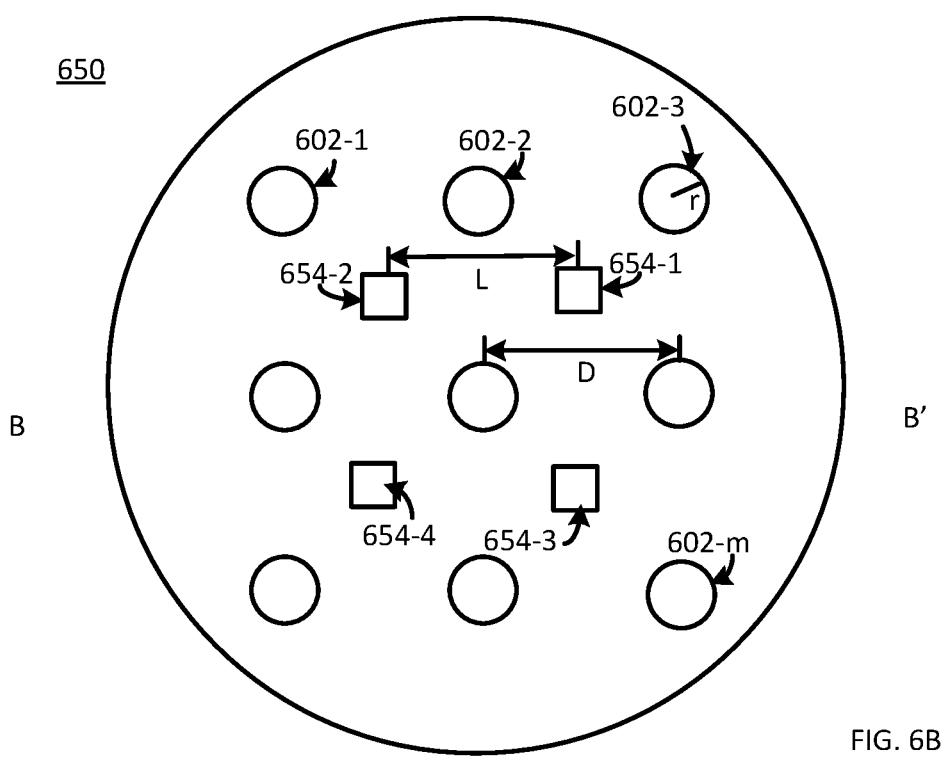

FIGS. 6A and 6B are sketches illustrating two example 600, 650 arrangements of light sources and beam forming features. FIGS. 6A and 6B may be best understood when considered together. Both arrangements 600, 650 correspond to cross section B-B' of FIG. 1B. In the FIGS. 6A and 6B, small circles correspond to beam forming features and squares correspond to light sources, e.g., LEDs. It should be noted that other beam forming features and other light sources may have different shapes, consistent with the present disclosure. The first example arrangement 600 and second example arrangement 650 are configured to illustrate varying a number of lights and/or locations in a light source assembly while maintaining a fixed configuration of a corresponding 3-D optic. Varying the number and/or locations of light sources is configured to adjust a beam pattern. In other words, one 3-D optic may be configured to produce a plurality of beam shapes by varying the number and/or locations of the light sources associated with the light source assembly.

Example arrangements 600, 650 include a plurality of beam forming features 602-1, 602-2, . . . , 602-$m$. The beam forming features 602-1, 602-2, . . . , 602-$m$ in these examples have a generally circular cross section with radius, r, however, this disclosure is not limited in this regard. Beam forming features 602-1, 602-2, . . . , 602-$m$ may have any shape, as described herein. The beam forming features 602-1, 602-2, . . . , 602-$m$ are arranged in an array with adjacent beam forming features separated by distance, D The first example arrangement 600 includes a plurality of light sources 604-1, 604-2, . . . , 604-$m$. In this first example 600, the light sources 604-1, 604-2, . . . , 604-$m$ are coincident, i.e., aligned, with the beam forming features 602-1, 602-2, . . . , 602-$m$. The light sources are separated by a distance, L, and L is equal to D, in this example. In this first example 600, the number of light sources equals the number of beam forming features and each light source is aligned with a respective beam forming feature.

The second example arrangement 650, includes fewer light sources 654-1, 654-2, . . . , 654-4 than beam forming features 602-1, 602-2, . . . , 602-$m$, with m=9. The light sources are not coincident with the beam forming features. It may be appreciated that the first example arrangement 600 and the second sample arrangement 650 may provide different beam shapes. The shape of the beam produced may be varied by varying one or more of the number of light sources, the number of beam forming features, the locations of the light sources relative to the locations of the beam forming features and/or the sizes (and shapes) of the beam forming features.

Thus, light sources may be positioned relative to beam forming features and may be configured to generate a beam with an associated beam shape. Each light source may be coincident with a respective beam forming feature, may not overlap the beam forming feature or may partially overlap the beam forming feature. The number and locations of light sources for a given 3-D optic may then produce an associated beam pattern related to the number and respective locations of the light sources.

It may be appreciated that the 3-D optics and light source assemblies, as described herein, are generally configured to beam form visible light (wavelengths in the range of about 400 nanometers (nm) to about 700 nm). The dimensions of the of the beam forming features are larger than the wavelength of visible light. In one nonlimiting example, dimensions of the beam forming features are at least two times the wavelength. In another nonlimiting example, the dimensions of the beam forming features are ten times the wavelength. Thus, a dimension of the beam forming features is generally at least twice a maximum wavelength of the incident light.

Turning again to FIG. 1, top layer 116 may be included in at least some of the example 3-D optics, positioned above the second (emitting) surface. The top layer 116 is configured to reduce accumulation of dirt and/or debris on a lighting fixture that includes features on or in the second surface. In other words, top layer is configured to provide a generally flat surface configured to reduce and/or avoid dirt accumulation and to thus reduce corresponding degradation in performance.

Thus, an apparatus, method and/or system may be configured to form a 3-D optic with a beam forming feature using an additive manufacturing and/or 3-D printing technique. The beam forming feature may include an internal structure and/or may be included in a surface of the 3-D optic. The 3-D optic with beam forming features may then be configured to generate and emit a selected beam pattern. Beam patterns may include, but are not limited to, narrow beam, wide beam, batwing and asymmetric. 3-D printing may be performed on-site and/or on-demand, thus facilitating formation of 3-D optics.

What is claimed is:

1. A three-dimensional (3-D) optic for beam shaping, the 3-D optic comprising:
   a first surface configured to receive incident light;
   a second surface positioned relative to the first surface, the second surface configured to emit a light beam, the emitted light beam having a shape; and
   a beam forming feature, the emitted beam shape related to the beam forming feature, the beam forming feature formed by a 3-D manufacturing process, the beam forming feature comprising an internal structure positioned between the first surface and the second surface, the internal structure corresponding to a void or comprising a material having an optical property different from an optical property of a surrounding region, each optical property selected from the group comprising a refractive index, an absorption characteristic and a reflection characteristic, wherein a dimension of the beam forming feature is at least twice a maximum wavelength of the incident light.

2. The 3-D optic of claim 1, wherein the 3-D manufacturing process is selected from the group comprising 3-D printing, additive manufacturing, and/or material deposition.

3. The 3-D optic of claim 1, wherein the beam forming feature is included in at least one of the first surface and the second surface.

4. The 3-D optic of claim 1, wherein at least one of the first surface and the second surface is planar.

5. The 3-D optic of claim 1, wherein at least one of the first surface and the second surface is non-planar.

6. The 3-D optic of claim 1, wherein the second surface opposes the first surface.

7. The 3-D optic of claim 1, wherein the emitted beam shape is selected from the group comprising wide beam, narrow beam, batwing beam, and asymmetric beam.

8. A lighting fixture comprising:
   a light source assembly comprising at least one light source, each light source configured to emit incident light; and
   a three-dimensional (3-D) optic configured to receive the emitted incident light and to emit a light beam having a beam shape, the 3-D optic comprising:
      a first surface configured to receive the incident light;
      a second surface positioned relative to the first surface, the second surface configured to emit the light beam, and
      a beam forming feature, the emitted beam shape related to the beam forming feature, the beam forming feature formed by a 3-D manufacturing process, the beam forming feature comprising an internal structure positioned between the first surface and the second surface, the internal structure corresponding to a void or comprising a material having an optical property different from an optical property of a surrounding region, each optical property selected from the group comprising a refractive index, an absorption characteristic and a reflection characteristic, wherein a dimension of the beam forming feature is at least twice a maximum wavelength of the incident light.

9. The lighting fixture of claim 8, wherein each light source is selected from the group comprising a semiconductor a light emitting diode (LED), an organic LED, a polymer LED, a micro-LED and a laser.

10. The lighting fixture of claim 8, wherein the light source assembly comprises a plurality of light sources, the 3-D optic comprises a plurality of beam forming features and each light source is positioned relative to at least one beam forming feature.

11. The lighting fixture according to claim 8, wherein the beam forming feature is included in at least one of the first surface and the second surface.

12. The lighting fixture according to claim 8, wherein at least one of the first surface and the second surface is planar.

13. The lighting fixture according to claim 8, wherein at least one of the first surface and the second surface is non-planar.

14. The lighting fixture according to claim 8, wherein the emitted beam shape is selected from the group comprising wide beam, narrow beam, batwing beam, and asymmetric beam.

15. The lighting fixture according to claim 8, further comprising a reflector coupled to the 3-D optic configured to reflect at least a portion of the emitted incident light.

16. The lighting fixture according to claim 8, further comprising a top layer positioned above the second surface and configured to avoid dirt build up.

* * * * *